US012652203B2

(12) United States Patent
Smith et al.

(10) Patent No.: US 12,652,203 B2
(45) Date of Patent: Jun. 9, 2026

(54) SYSTEM AND METHOD FOR MODIFYING A SIGNAL USING INVERTED MIRROR IMAGES OF THE SIGNAL

(71) Applicant: TeraWave, LLC, Naples, FL (US)

(72) Inventors: Alvie McKinley Smith, Hillsboro, MO (US); Timothy Huff, Wildwood, MO (US); Torsten Schultze, Naples, FL (US); Ulrich Altvater, Naples, FL (US)

(73) Assignee: TereWave, Inc., McKinney, TX (US)

( * ) Notice: Subject to any disclaimer, the term of this patent is extended or adjusted under 35 U.S.C. 154(b) by 0 days.

(21) Appl. No.: 18/661,490

(22) Filed: May 10, 2024

(65) Prior Publication Data

US 2024/0388480 A1     Nov. 21, 2024

Related U.S. Application Data

(60) Provisional application No. 63/503,380, filed on May 19, 2023.

(51) Int. Cl.
H04L 27/12     (2006.01)
H04L 27/26     (2006.01)

(52) U.S. Cl.
CPC ........ H04L 27/122 (2013.01); H04L 27/2602 (2013.01)

(58) Field of Classification Search
CPC .............. H04L 27/122; H04L 27/2602; H04L 27/26025; H04L 27/261; H04L 27/2613; H04L 27/26132; H04L 27/26134; H04L 27/26136; H04L 27/2614; H04L 27/2615; H04L 27/2618; H04L 27/262; H04L 27/2621; H04L 27/2623; H04L 27/2624; H04L 27/2627; H04L 27/2603; H04L 27/2605
See application file for complete search history.

(56) References Cited

U.S. PATENT DOCUMENTS

| | | | | |
|---|---|---|---|---|
| 12,184,465 B1 * | 12/2024 | Geva | ................... | H04L 27/2624 |
| 2002/0041637 A1 * | 4/2002 | Smart | ................ | H04L 27/2647 |
| | | | | 375/316 |
| 2022/0173948 A1 * | 6/2022 | Schultze | .............. | H04L 1/0042 |

* cited by examiner

Primary Examiner — Khanh C Tran
(74) Attorney, Agent, or Firm — Cooley LLP

(57) ABSTRACT

A system and method for inverted mirror image waveform generation. The method includes generating a first inverted mirror image waveform corresponding to an inverted mirror image of a first waveform occupying a first period of a communication signal. A second inverted mirror image waveform corresponding to an inverted mirror image of a second waveform occupying a second period of the communication signal is also generated. The first waveform, the first inverted mirror image waveform, the second waveform and the second inverted mirror image waveform are concatenated to create a modified communication signal.

14 Claims, 14 Drawing Sheets

400

Transmitter 412

Input Data — 414

Modulated Waveforms 416

Inverted Mirror Image Waveforms 418

Signal Synthesizer 417

Inverted Mirroring Level (L)

419

Communications Channel 420

419

Receiver

Modulated Signal Extractor 424

415

Demodulator 425

Carrier Signal 427

422

Inverted Mirroring Level

Recovered Input Data

14'

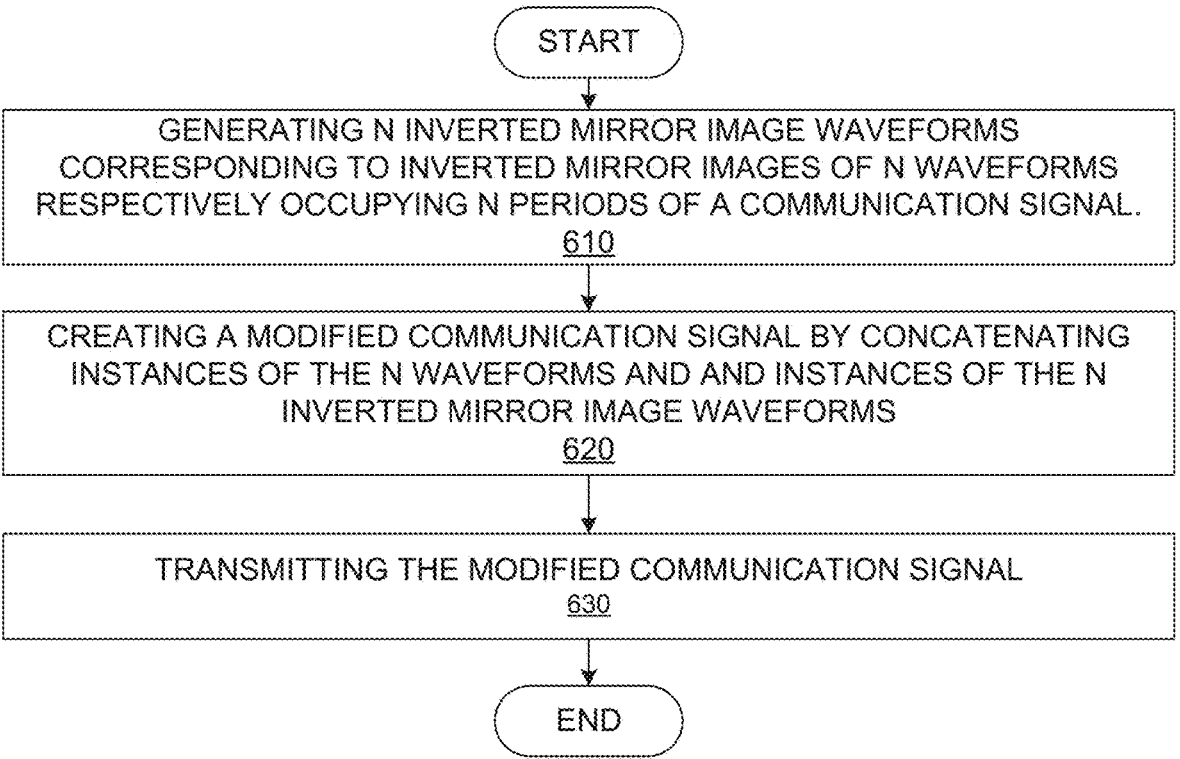

START

GENERATING N INVERTED MIRROR IMAGE WAVEFORMS
CORRESPONDING TO INVERTED MIRROR IMAGES OF N WAVEFORMS
RESPECTIVELY OCCUPYING N PERIODS OF A COMMUNICATION SIGNAL.
610

CREATING A MODIFIED COMMUNICATION SIGNAL BY CONCATENATING
INSTANCES OF THE N WAVEFORMS AND AND INSTANCES OF THE N
INVERTED MIRROR IMAGE WAVEFORMS
620

TRANSMITTING THE MODIFIED COMMUNICATION SIGNAL
630

END

*FIG. 6*

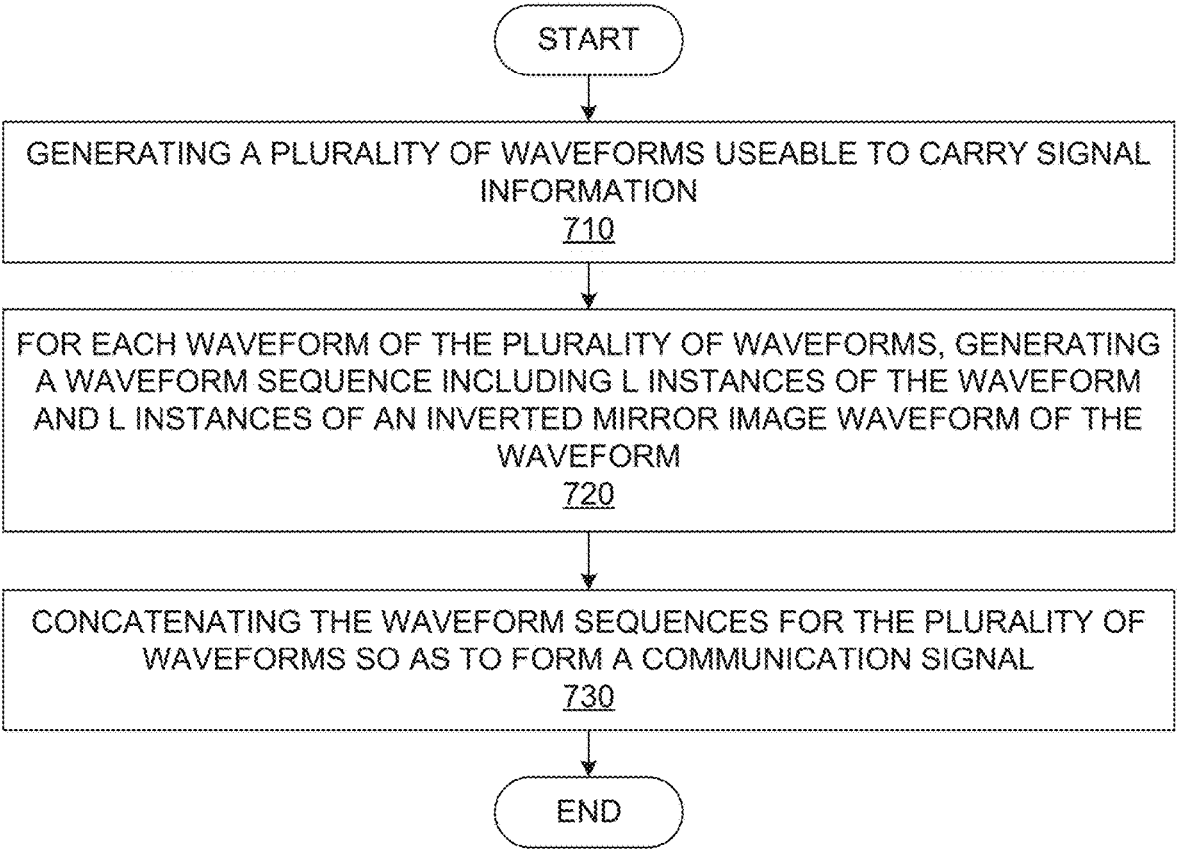

START

GENERATING A PLURALITY OF WAVEFORMS USEABLE TO CARRY SIGNAL INFORMATION
710

FOR EACH WAVEFORM OF THE PLURALITY OF WAVEFORMS, GENERATING A WAVEFORM SEQUENCE INCLUDING L INSTANCES OF THE WAVEFORM AND L INSTANCES OF AN INVERTED MIRROR IMAGE WAVEFORM OF THE WAVEFORM
720

CONCATENATING THE WAVEFORM SEQUENCES FOR THE PLURALITY OF WAVEFORMS SO AS TO FORM A COMMUNICATION SIGNAL
730

END

*FIG. 7*

SYSTEM AND METHOD FOR MODIFYING A SIGNAL USING INVERTED MIRROR IMAGES OF THE SIGNAL

CROSS-REFERENCE TO RELATED APPLICATIONS

This application claims the benefit of priority under 35 U.S.C. § 119 (e) of U.S. Provisional Patent Application No. 63/503,380, entitled SYSTEM AND METHOD FOR MODIFYING A SIGNAL USING INVERTED MIRROR IMAGES OF THE SIGNAL, filed on May 19, 2023, the content of which is incorporated herein by reference in its entirety for all purposes.

FIELD

The present disclosure pertains generally to data communication systems and, in particular, to methods and systems for improving spectral efficiency.

BACKGROUND

Traditional modulation techniques, such as amplitude modulation (AM) and frequency modulation (FM), suffer from inherent inefficiencies that limit their capacity for high-speed data transmission. More advanced modulation techniques, such as quadrature amplitude modulation (QAM) and quadrature phase shift keying (QPSK), have been developed to improve data transmission rates. However, even these techniques have limitations in terms of the amount of information that can be transmitted over a given bandwidth.

One of the main inefficiencies associated with QAM and QPSK modulation is their limited spectral efficiency. Spectral efficiency refers to the amount of information that can be transmitted over a given bandwidth. QAM and QPSK modulation techniques are not able to efficiently use the available bandwidth, as they require a large amount of spectral resources to achieve high data rates. This limits their capacity to transmit large amounts of data over long distances.

The demand for high-speed data transmission has increased significantly in recent years, driven in part by the proliferation of applications requiring substantial bandwidth, such as audio and video streaming, sharing of photos and videos, and more. This trend has increased the strain on existing wireless and other telecommunications systems, which are struggling to keep up with the growing demand for bandwidth, and has created a need to utilize the available spectrum more efficiently.

Various techniques have been proposed in an attempt to reduce the spectral bandwidth required for transmission without significantly degrading the quality of the transmitted signals. These techniques include bandwidth compression and signal shaping.

Bandwidth compression techniques typically involve reducing the occupied bandwidth of a modulated signal by selectively filtering out unwanted frequencies. These techniques can be effective, but they often result in signal distortion and loss of information.

Signal shaping techniques involve modifying the waveform of the modulated signal to reduce its spectral bandwidth while maintaining its original shape and quality. These techniques can be helpful in reducing required bandwidth, but they can be complex and computationally intensive.

SUMMARY

Disclosed herein is a signal modification system and method that can be used to effectively reduce the spectral bandwidth required to transmit modulated signals. The inventive system and method operates to create modified communication signals based upon modulated signals which would otherwise be transmitted. This results in concentrating a greater percentage of the transmitted signal energy near the carrier frequency, thereby effectively reducing the bandwidth required for signal transmission while maintaining signal quality and integrity.

In one aspect the present disclosure describes a method which includes generating a first inverted mirror image waveform corresponding to an inverted mirror image of a first waveform occupying a first period of a communication signal. Embodiments may also include generating a second inverted mirror image waveform corresponding to an inverted mirror image of a second waveform occupying a second period of the communication signal. Embodiments may also include concatenating the first waveform, the first inverted mirror image waveform, the second waveform and the second inverted mirror image waveform to create a modified communication signal.

In some embodiments, the method may include transmitting the modified communication signal. Embodiments may also include generating N inverted mirror image waveforms corresponding to inverted mirror images of N waveforms respectively occupying N periods of a communication signal.

Embodiments may also include creating a modified communication signal by concatenating instances of the N waveforms and instances of the N inverted mirror image waveforms. In some embodiments, the modified communication signal includes N intervals. In some embodiments, an $i^{th}$ interval of the N intervals includes L instances of an $i^{th}$ of the N waveforms and L instances of an $i^{th}$ of the N inverted mirror images waveforms, where L may be an integer greater than 0 and corresponds to a level of inverted mirroring and where i=1, 2 . . . N.

In some embodiments, the communication signal may be represented by a function f(t). In some embodiments, the generating the first inverted mirror image waveform includes evaluating $-f(-t)$ over an interval corresponding to a first period of the communication signal. In some embodiments, the generating the second inverted mirror image waveform includes evaluating $-f(-t)$ over an interval corresponding to a second period of the communication signal.

In some embodiments, first and second of the N waveforms may be respectively denoted by w1 and w2 and first and second the N inverted mirror image waveforms may be respectively denoted by IMw1 and IMw2. The creating the modified communication signal further includes, for L=1, concatenating w1 and IMw1 for inclusion within the first of the N intervals and concatenating w2 and IMw2 for inclusion with a second of the N intervals.

In some embodiments, first and second of the N waveforms may be respectively denoted by w1 and w2 and first and second the N inverted mirror image waveforms may be respectively denoted by IMw1 and IMw2, the creating the modified communication signal further including, for L=2, generating a waveform sequence w1, IMw1, IMw1, w1 for inclusion within the first of the N intervals and generating a waveform sequence w2, IMw2, IMw2, w2 for inclusion with a second of the N intervals.

In some embodiments, first and second of the N waveforms may be respectively denoted by w1 and w2 and first and second the N inverted mirror image waveforms may be respectively denoted by IMw1 and IMw2, the creating the modified communication signal further including, for L=4, generating a waveform sequence w1, IMw1, IMw1, w1, IMw1, w1, w1, IMw1 for inclusion within the first of the N intervals and generating a waveform sequence of w2, IMw2, IMw2, w2, IMw2, w2, w2, IMw2 for inclusion with a second of the N intervals.

Embodiments of the present disclosure may also include a method including generating a plurality of waveforms useable to carry signal information. Embodiments may also include, for each waveform of the plurality of waveforms, generating a waveform sequence including L instances of the waveform and Z instances of an inverted mirror image waveform of the waveform, where L may be an integer greater than 0. Embodiments may also include concatenating the waveform sequences for the plurality of waveforms so as to form a communication signal.

A first of the plurality of waveforms may be denoted by w1, a second of the plurality of waveforms may be denoted by w2, a first inverted mirror image waveform of w1 may be denoted by IMw1, and a second inverted mirror image waveform of w2 may be denoted by IMw2. The concatenating may further include, for L=1, concatenating w1 and IMw1 for inclusion within a first of the waveform sequences and concatenating w2 and IMw2 for inclusion with a second of the waveform sequences.

A first of the plurality of waveforms may be denoted by w1, a second of the plurality of waveforms may be denoted by w2, a first inverted mirror image waveform of w1 may be denoted by IMw1, and a second inverted mirror image waveform of w2 may be denoted by IMw2, the concatenating further including, for L=1, generating w1, IMw1, IMw1, w1 for inclusion within a first of the waveform sequences and generating w2, IMw2, IMw2, w2 for inclusion with a second of the waveform sequences.

In other embodiments a first of the plurality of waveforms may be denoted by w1, a second of the plurality of waveforms may be denoted by w2, a first inverted mirror image waveform of w1 may be denoted by IMw1, and a second inverted mirror image waveform of w2 may be denoted by IMw2, the concatenating further including, for L=1, generating w1, IMw1, IMw1, w1, IMw1, w1, w1, IMw1 for inclusion within a first of the waveform sequences and generating w2, IMw2, IMw2, w2, IMw2, w2, w2, IMw2 for inclusion with a second of the waveform sequences. In some embodiments, the communication signal may be represented by a function f(t). In some embodiments, a first instance of the L instances of an inverted mirror image waveform corresponds to evaluation of $-f(-t)$ over an interval corresponding to a first period of the communication signal.

In some embodiments, the communication signal may be represented by a function f(t). In some embodiments, the generating N inverted mirror image waveforms includes evaluating $-f(-t)$ over N intervals respectively corresponding to the N periods of the communication signal.

Embodiments of the present disclosure may also include a signal modification apparatus, the apparatus including a processor and a memory including a buffer for storing periods of a modulated carrier signal. The memory further includes instructions which, when executed by the processor, cause the processor to (i) generate a plurality of inverted mirror image waveforms corresponding to inverted mirror images of the periods of the modulated carrier signal, and (ii) create a modified communication signal by inserting one or more of the plurality of inverted mirror image waveforms between ones of the plurality of periods of the modulated carrier signal.

In some embodiments, the modulated carrier signal may be represented by a function f(t). In some embodiments, the instructions further include instructions which, when executed by the processor, cause the processor to generate a first inverted mirror image waveform of the plurality of inverted mirror image waveforms by evaluating $-f(-t)$ over an interval corresponding to a first period of the modulated carrier signal.

Embodiments of the present disclosure may also include a signal modification apparatus, the apparatus including a processor and a memory including a buffer for storing periods of a modulated carrier signal. The memory further includes instructions which, when executed by the processor, cause the processor to generate N inverted mirror image waveforms corresponding to inverted mirror images of N waveforms respectively occupying N periods of the modulated carrier signal.

Embodiments may also include creating a modified communication signal by concatenating instances of the N waveforms and instances of the N inverted mirror image waveforms. In some embodiments, the modified communication signal includes N intervals. In some embodiments, an $i^{th}$ interval of the N intervals includes Z instances of an $i^{th}$ of the N waveforms and Z instances of an $i^{th}$ of the N inverted mirror images waveforms, where L may be an integer greater than 0 and corresponds to a level of inverted mirroring and where i=1, 2 . . . N.

In one embodiment first and second of the N waveforms may be respectively denoted by w1 and w2 and first and second the N inverted mirror image waveforms may be respectively denoted by IMw1 and IMw2. The instructions further including instructions which, when executed by the processor, cause the processor to, for L=1, generate a waveform sequence containing w1 and IMw1 for inclusion within the first of the N intervals and generate a waveform sequence containing w2 and IMw2 for inclusion within a second of the N intervals.

Other embodiments may also include first and second of the N waveforms being respectively denoted by w1 and w2 and first and second the N inverted mirror image waveforms being respectively denoted by IMw1 and IMw2. The instructions further including instructions which, when executed by the processor, cause the processor to, for L=2, generate a waveform sequence w1, IMw1, IMw1, w1 for inclusion within the first of the N intervals and generate a waveform sequence w2, IMw2, IMw2, w2 for inclusion with a second of the N intervals.

Embodiments may also include first and second of the N waveforms being respectively denoted by w1 and w2 and first and second the N inverted mirror image waveforms being respectively denoted by IMw1 and IMw2. The instructions further including instructions which, when executed by the processor, cause the processor to, for L=4, generate a waveform sequence w1, IMw1, IMw1, w1, IMw1, w1, w1, IMw1 for inclusion within the first of the N intervals and generate a waveform sequence of w2, IMw2, IMw2, w2, IMw2, w2, w2, IMw2 for inclusion with a second of the N intervals.

In some embodiments, the modulated carrier signal may be represented by a function f(t). In some embodiments, the instructions further include instructions which, when executed by the processor, cause the processor to generate the $i^{th}$ of the N inverted mirror image waveforms by evaluating $-f(-t)$ over the $i^{th}$ period of the N periods of the modulated carrier signal. In some embodiments, the signal modification apparatus may include an analog-to-digital converter configured to receive a modulated analog signal and to generate the periods of the modulated carrier signal. Embodiments may also include digital-to-analog converter circuitry for outputting the modified communication signal.

Embodiments of the present disclosure may also include a signal transmitter including a modulator for producing a modulated carrier signal. Embodiments may also include a buffer for storing periods of the modulated carrier signal. Embodiments may also include a signal modification module operative to (i) generate a plurality of inverted mirror image waveforms corresponding to inverted mirror images of the periods of the modulated carrier signal, and (ii) create a modified communication signal by inserting one or more of the plurality of inverted mirror image waveforms between ones of the plurality of periods of the modulated carrier signal. Embodiments may also include an output interface for outputting the modified communication signal.

In some embodiments, the modulated communication signal may be an analog modulated communication signal, the transmitter including an analog-to-digital converter configured to generate digital samples of the periods of the modulated communication signal for storage in the buffer. In some embodiments, the signal transmitter may include a digital-to-analog converter operatively coupled to the output interface.

Embodiments of the present disclosure may also include a signal transmitter including a modulator for producing a modulated communication signal. Embodiments may also include a buffer for storing periods of the modulated communication signal. Embodiments may also include a signal modification module operative to generate N inverted mirror image waveforms corresponding to inverted mirror images of N waveforms respectively occupying N periods of the modulated communication signal.

Embodiments of the present disclosure may also include a signal reconstruction apparatus, the apparatus including a processor. Embodiments may also include a memory including a buffer for storing a modified communication signal generated by inserting one or more of a plurality of inverted mirror image waveforms between ones of a plurality of periods of a modulated carrier signal.

In some embodiments, the plurality of inverted mirror image waveforms correspond to inverted mirror images of the periods of the modulated carrier signal, the memory further including instructions which, when executed by the processor, cause the processor to (i) identify the plurality of periods of the modulated carrier signal within the modified communication signal stored within the buffer, and (ii) reconstruct the modulated carrier signal into a reconstructed modulated carrier signal by concatenating the plurality of periods of the modulated carrier signal identified within the buffer.

Embodiments of the present disclosure may also include a signal receiver, including a processor. Embodiments may also include an input interface for receiving a modified communication signal generated at a transmitter by inserting one or more of a plurality of inverted mirror image waveforms between ones of a plurality of periods of a modulated carrier signal.

In some embodiments, the plurality of inverted mirror image waveforms correspond to inverted mirror images of the periods of the modulated carrier signal. Embodiments may also include an input buffer for storing the modified communication signal. Embodiments may also include a memory including instructions which, when executed by the processor, cause the processor to (i) identify the plurality of periods of the modulated carrier signal within the modified communication signal stored within the buffer, and (ii) reconstruct the modulated carrier signal into a reconstructed modulated carrier signal by concatenating the plurality of periods of the modulated carrier signal identified within the buffer. Embodiments may also include a demodulator for demodulating the reconstructed modulated carrier signal.

Embodiments of the present disclosure may also include a signal reconstruction apparatus, the apparatus including a processor. Embodiments may also include a memory including a buffer for storing a modified communication signal generated by concatenating instances of N waveforms respectively occupying N periods of a modulated carrier signal with and instances of N inverted mirror image waveforms corresponding to inverted mirror images of the N waveforms.

In some embodiments, the memory further including instructions which, when executed by the processor, cause the processor to identify the instances of the N waveforms of the modified communication signal stored within the buffer, and (ii) reconstruct the modulated carrier signal into a reconstructed modulated carrier signal by concatenating ones of the instances of the N waveforms stored within the buffer corresponding to the N periods of the modulated carrier signal.

Embodiments of the present disclosure may also include a signal receiver, including a processor. Embodiments may also include an input interface for receiving a modified communication signal generated at a transmitter by concatenating instances of N waveforms respectively occupying N periods of a modulated carrier signal with and instances of N inverted mirror image waveforms corresponding to inverted mirror images of the N waveforms.

In some embodiments, the modified communication signal includes N intervals. In some embodiments, an it interval of the N intervals includes L instances of an $i^{th}$ of the N waveforms and Z instances of an it of the N inverted mirror images waveforms, where L may be an integer greater than 0 and corresponds to a level of inverted mirroring and where $i=1, 2 \ldots N$.

Embodiments may also include an input buffer for storing the modified communication signal. Embodiments may also include a memory including instructions which, when executed by the processor, cause the processor to (i) identify the instances of the N waveforms of the modified communication signal stored within the buffer, and (ii) reconstruct the modulated carrier signal into a reconstructed modulated carrier signal by concatenating ones of the instances of the N waveforms stored within the buffer corresponding to the N periods of the modulated carrier signal. Embodiments may also include a demodulator for demodulating the reconstructed modulated carrier signal.

Embodiments of the present disclosure may also include a signal transmitter including an input interface for receiving input data. Embodiments may also include a first buffer for storing waveforms. Embodiments may also include a second buffer for storing inverted mirror images of the waveforms. Embodiments may also include a signal synthesizer module configured to generate a communication signal in accordance with the input data where the communication signal has instances of N of the waveforms and instances of N of the inverted mirror image waveforms, the communication signal including N intervals.

In some embodiments, an $i^{th}$ interval of the N intervals includes Z instances of an it of the N waveforms and L instances of an $i^{th}$ of the N inverted mirror image waveforms, where L may be an integer greater than 0 and corresponds to a level of inverted mirroring and where $i=1, 2 \ldots N$. Embodiments may also include an interface for receiving an indication of a value of L. Embodiments may also include an output interface for outputting the modified communication signal.

Embodiments of the present disclosure may also include a signal receiver, including a processor. Embodiments may also include an input interface for receiving a modified communication signal generated at a transmitter by concatenating instances of N waveforms respectively occupying N periods of a modulated carrier signal with and instances of N inverted mirror image waveforms corresponding to inverted mirror images of the N waveforms.

Embodiments may also include an input buffer for storing the modified communication signal. Embodiments may also include a memory including instructions for a modulated signal reconstruction module which, when executed by the processor, cause the processor to (i) identify the instances of the N waveforms of the modified communication signal stored within the buffer, and (ii) reconstruct the modulated carrier signal into a reconstructed modulated carrier signal by concatenating ones of the instances of the N waveforms stored within the buffer corresponding to the N periods of the modulated carrier signal. Embodiments may also include a demodulator for demodulating the reconstructed modulated carrier signal. In some embodiments, the signal receiver may include an analog-to digital converter being configured to receive the modified communication signal and to generate samples of the modified communication signal for storage in the input buffer.

These and other advantages of the present disclosure will become apparent after considering the following detailed specification in conjunction with the accompanying drawings, wherein:

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. Also, common but well-understood elements that are useful or necessary in a commercially feasible embodiment are often not depicted in order to facilitate a less obstructed view of these various embodiments of the present invention. In the drawings, like reference characters generally refer to like features (e.g., functionally similar and/or structurally similar elements).

FIG. 6 is a flowchart that describes an alternate signal modification method according to some embodiments of the present disclosure.

FIG. 7 is a flowchart that describes a method for generating a communication signal according to some embodiments of the present disclosure.

DETAILED DESCRIPTION

Figure 1:
FIG. 1 is a communications system which includes a transmitter configured to receive input data.

With reference now to FIG. 1, a data transmission or communications system 10 is shown to comprise a transmitter 12 configured to receive input data 14. The transmitter 12 includes a modulator 16 which generates a modulated signal 15 by modulating a carrier signal 18 (e.g., a sinusoidal carrier) in accordance with the input data 14. The modulation of the carrier signal 18 performed by the modulator 16 can be in accordance with a known modulation scheme such as, for example, amplitude modulation, frequency modulation, phase modulation, and the like. The modulated signal 15 generated by the modulator is then provided to a signal modification module 17. As is discussed below, the signal modification module 17 is configured to generate N inverted mirror image waveforms corresponding to inverted mirror images of N waveforms respectively occupying N periods of the modulated signal 15. In one embodiment the signal modification module generates a modified communication signal 19 by concatenating instances of the N waveforms and instances of the N inverted mirror image waveforms. The modified communication signal 19 may include N intervals where an $i^{th}$ interval of the N intervals includes L instances of an $i^{th}$ of the N waveforms and Z instances of an $i^{th}$ of the N inverted mirror images waveforms, where L is an integer greater than 0 and corresponds to a level of inverted mirroring and where i=1, 2 . . . N. The value of L may be specified to the transmitter 12 through, for example, a dedicated switch on the transmitter, a user interface or a separate signal conveyed through a wired or wireless connection.

The transmitter 12 transmits the modified communication signal 19 over a communications channel 20. As shown, the system 10 also includes a receiver 22 for receiving the modified communication signal 19. The communications channel 20 may be provided by media such as coaxial cable, fiber optic cable, telephone or telephone company (telco) lines such as copper wires, open air as by radio frequency or space or satellite. The channel 20 may carry one or many messages. The receiver 22 includes a modulated signal reconstruction module 24 configured to perform a converse process of the signal modification module 17 in order to reconstruct a replica of the modulated signal 15 from the modified communication signal 19. A demodulator 25 then demodulates the reconstructed modulated signal 15' to recover estimated input data 14'. If desired, the demodulator 25 outputs the estimated input data 14' to some other device, such as, by way of example only, a monitor, a computer, an audio component, or a speaker. The value of L may be specified to the transmitter 22 through, for example, a dedicated switch on the transmitter, a user interface or a separate signal conveyed through a wired or wireless connection. Alternatively, the value of L may be provided to the receiver 22 in a preamble to the modified communication signal 19.

Figures 2A, 2B, 2C:
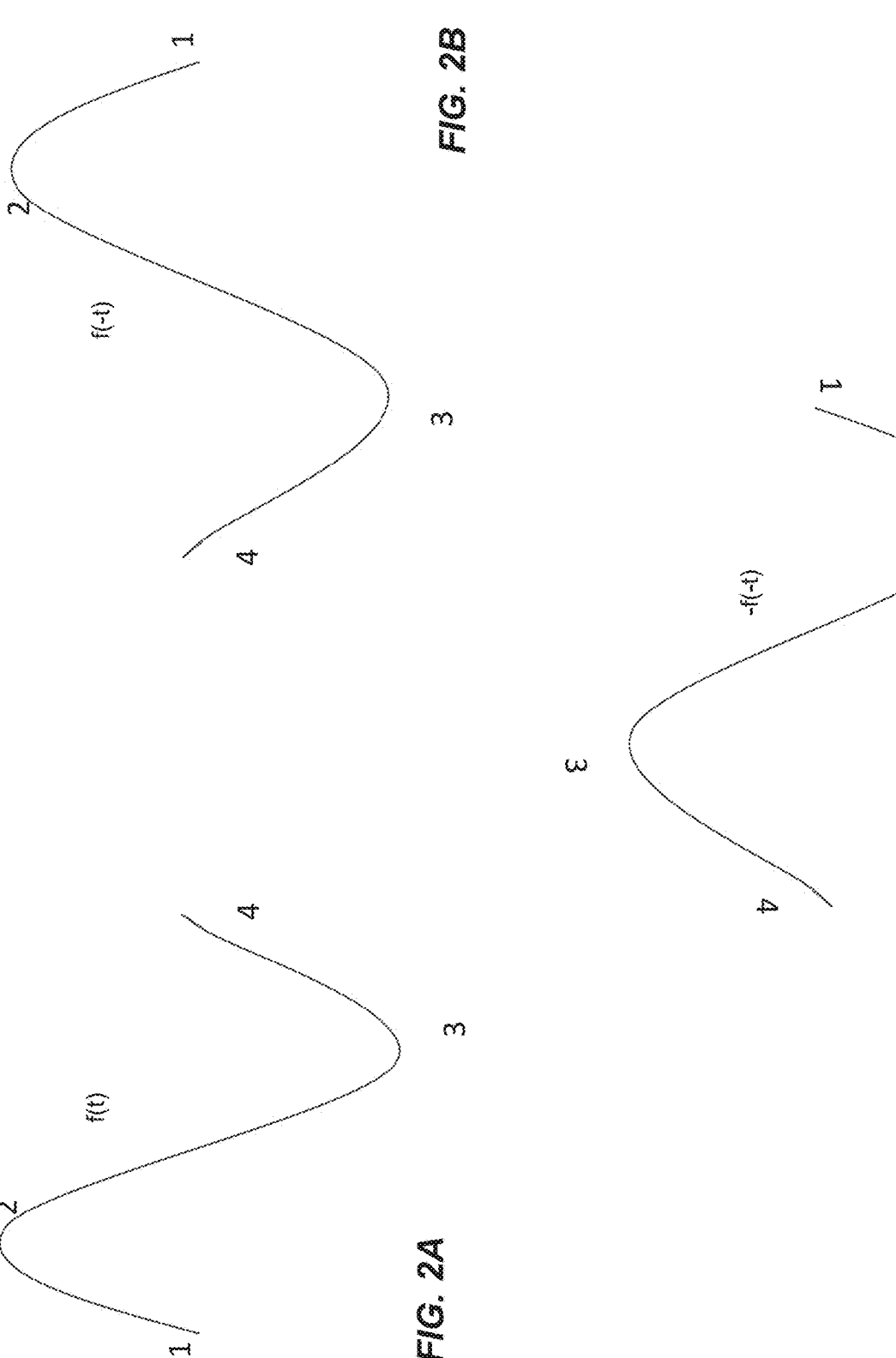
FIG. 2A is an illustration of a waveform (wX) included within an $X^{th}$ period of a modulated signal represented by f(t).
FIG. 2B illustrates a first step in generating an inverted mirror image of the waveform wX.
FIG. 2C illustrates an inverted mirror image (IM) of wX.

Turning now to FIG. 2A, an illustration is provided of a waveform (wX) included within an $X^{th}$ period of a modulated signal represented by f(t). As shown in FIG. 2B, a first step in generating an inverted mirror image of the waveform wX may include replacing (t) with (–t) within f(t); that is, by transforming f(t) to f(–t). Next, as illustrated by FIG. 2C, f(–t) is inverted so as create an inverted mirror image (IM) of wX. That is, the inverted mirror image (IMwX) of wX may be obtained by evaluating –f(–t) over a time period corresponding to the $X^{th}$ period of the modulated signal.

Figures 3A, 3B, 3C, 3D:
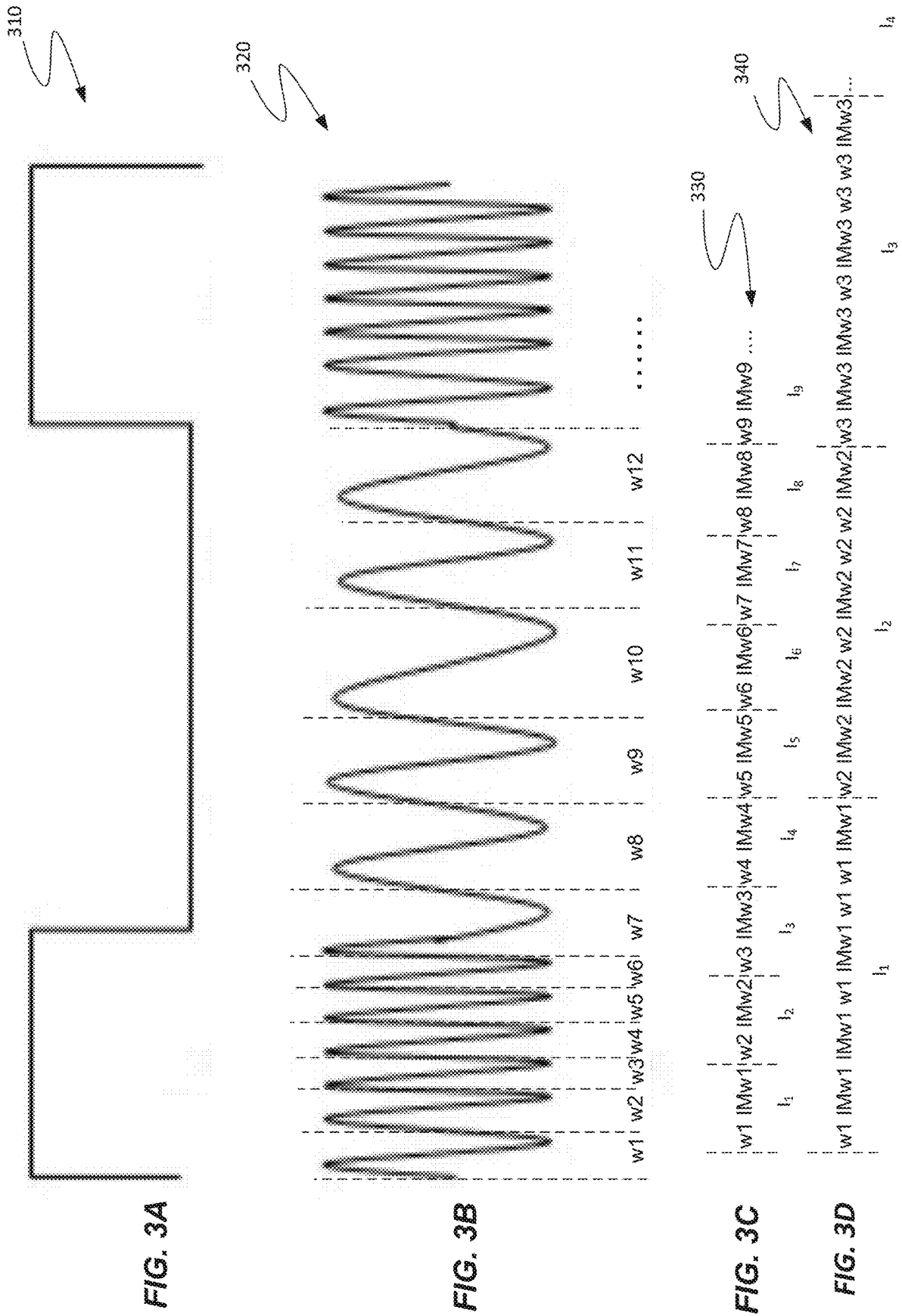
FIGS. 3A-3D illustrate a modulated signal and structures of exemplary modified communication signals generated based upon the modulated signal.

Referring now to FIGS. 3A-3D, illustrations are provided of a modulated signal and of the structures of exemplary modified communication signals generated based upon the modulated signal. Specifically, FIG. 3A depicts input digital data 310 used to modulate the frequency of a carrier signal (not shown) in order to generate a frequency-shift-keying (FSK) modulated signal 320 illustrated in FIG. 3B. The FSK modulated signal 320 includes a plurality of periods where a waveform included within an $n^{th}$ of the periods is denoted by wn, e.g., w1, w2 and so on. Referring to FIG. 3C, in one exemplary embodiment an $n^{th}$ of the N intervals (In) of a modified communication signal structure 330 simply includes the waveform (wX) included within the $X^{th}$ period of the modulated signal 15 and its inverted mirror image (IMwX). That is, the modified communication signal structure 330 may be generated by concatenating the waveforms w1, IMw1, w2, IMw2, w3, IMw3, w4, IMw4, w5, IMw5, . . . wN, IMwN.

It has been found that the modified communication signal structure of the exemplary embodiment of FIG. 3C improves upon prior art modulation techniques by effecting cancellation of signal energy which would otherwise be transmitted on frequencies distal from a carrier frequency. However, in other embodiments larger numbers of instances of a modulated signal waveform and its inverted mirror image may be transmitted during each interval of a modified communication signal in order to further increase such cancellation of signal energy. For example, in accordance with an additional exemplary embodiment, each interval of a modified communication signal structure includes two instances of a waveform included within a corresponding period of the modulated signal 320 along with two instances of an inverted mirror image of the waveform.

FIG. 3D illustrates another embodiment of a modified communication signal structure 340 in accordance with the disclosure. In the embodiment of FIG. 3D, four instances of a waveform included within a given period of the modulated signal 320 are transmitted along with four instances of an inverted mirror image of the waveform during each interval (In) of a modified communication signal structure 340 . . . . As is illustrated by FIG. 3D, it has been further found that the instances of a waveform and it is inverted mirror images may be arranged in a given interval of a modified communication signal structure 340 in accordance with a Thue-Morse sequence in order to increase the degree of such signal cancellation. A Thue-Morse sequence is a sequence of numbers obtained from the parities of the counts of 1's in the binary representation of the nonnegative integers. By directly taking the parities a Thue-Morse sequence may be represented as:

$$t_n = s_2(n)(\bmod 2),$$

where $s_2$ (n) is the binary digit sum. For n=, 1, 2 . . . , the first few terms are then given by 0, 1, 1, 0, 1, 0, 0, 1, 1, 0, 0, 1, . . . . An alternate form of the sequence obtained by the taking the binary complement is given by 1, 0, 0, 1, 0, 1, 1, 0, 0, 1, . . . . As suggested above, a Thue-Morse sequence is a binary sequence that can be constructed using a recursive process.

It may be appreciated that the modified communication signal structure 340 accords with the Thue-Morse sequence of 0, 1, 1, 0, 1, 0, 0, 1, 1, 0, 0, 1 . . . since replacing 0 with wX and 1 with IMwX yields the signal structure 340 (i.e., w1, IMw1, IMw1, w1, IMw1, w1, w1, IMw1, w2, IMw2, IMw2, w2, IM2w2, w2, w2, IM2, w3 . . . )

Figure 4:
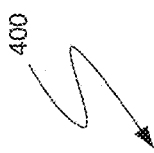
FIG. 4 is a block diagram of an alternate embodiment of a data transmission or communications system in accordance with the disclosure.

FIG. 4 is a block diagram of an alternate embodiment of a data transmission or communications system 400 in accordance with the disclosure. The system 400 is shown to comprise a transmitter 412 configured to receive input data 414. The transmitter 412 includes a signal synthesizer 417 configured to generate a modified communication signal 419 using modulated waveforms 416 and inverted mirror image waveforms 418 corresponding to inverted mirror images of the modulated waveforms 416. The system 400 also includes a receiver 422 configured to receive and process the modified communication signal 419 in the manner descried below.

In comparing the transmitter 12 of FIG. 1 and the transmitter 412 of FIG. 4, it may be appreciated that the modulator 16 of the transmitter 12 generates a modulated signal 15 by modulating the carrier signal 18 based upon the input data 14. The signal modification module 417 of the transmitter 12 then generates the modified communication signal 19, which includes an interval corresponding to each period of the modulated signal 15. Each interval of the modified communication signal 19 includes instances of both the waveform within the corresponding period of the modulated signal 15 and instances of an inverted mirror images of such waveform.

As will be discussed below, in the system 400 of FIG. 4 the modified communication signal 419 produced by the signal synthesizer 417 is of a substantially similar format as the modified communication signal 19 produced by the signal modification module 17. However, in the system of FIG. 4 the signal synthesizer 417 directly synthesizes the modified communication signal 417 in accordance with the input data 414 using pre-stored modulated waveforms 416 and pre-stored inverted mirror image waveforms 418. That is, rather than first generating a modulated signal and then modifying it to create a modified communication signal as in the system 10 of FIG. 1, in the system of FIG. 4 the act of creating a modulated signal is omitted and modulated waveforms 416 corresponding to periods of one or more modulated signals are instead pre-stored or generated as needed. In the embodiment of FIG. 4 the signal synthesizer 417 need not first form a modulated signal to be used as the basis for a modified communication signal but instead may proceed to directly generate the modified communication signal by concatenating instances of the modulated waveforms 416 (corresponding to a user-selected or predefined modulated signal) and instances of the inverted mirror image waveforms 418 in the manner described hereinafter.

The modulated waveforms 416, typically stored in digital form, may reflect periods of carrier signals modulated using known modulation schemes such as, for example, amplitude modulation, frequency modulation, phase modulation, and the like. Similarly, the inverted mirror image waveforms 418 are also typically stored in digital form and comprise inverted mirror images of the modulated waveforms 416. In one embodiment the signal synthesizer module 417 generates the modified communication signal 419 by concatenating instances of N modulated waveforms 416 occupying N periods of a user-selected or predefined modulated carrier signal and instances of N inverted mirror image waveforms 418 respectively corresponding to inverted mirror images of the N modulated waveforms. More particularly, the modified communication signal 419 may include N intervals where an $i^{th}$ interval of the N intervals includes L instances of an $i^{th}$ of the N modulated waveforms 416 and L instances of an $i^{th}$ of the N inverted mirror images waveforms 418, where L is an integer greater than 0 and corresponds to a level of inverted mirroring and where i=1, 2 . . . N. The value of L may be specified to the transmitter 412 through, for example, a dedicated switch of the transmitter 412, a user interface, or a separate signal conveyed to the transmitter 412 through a wired or wireless connection.

The transmitter 412 transmits the modified communication signal 419 over a communications channel 420. The communications channel 420 may be provided by media such as coaxial cable, fiber optic cable, telephone or telephone company (telco) lines such as copper wires, open air as by radio frequency or space or satellite. The channel 420 may carry one or many messages. The receiver 422 includes a modulated signal extractor module 424 configured to perform a converse process of the signal synthesizer 417 in order to extract a replica 415 of the user-selected or predefined modulated signal from the modified communication signal 419. A demodulator 425 provided with a carrier signal 427 then demodulates the replica 415 of the user-selected or predefined modulated signal to recover estimated input data 14' and, if desired, to output the estimated input data 14' to some other device, such as, by way of example only, a monitor, a computer, an audio component, or a speaker.

Figure 5:
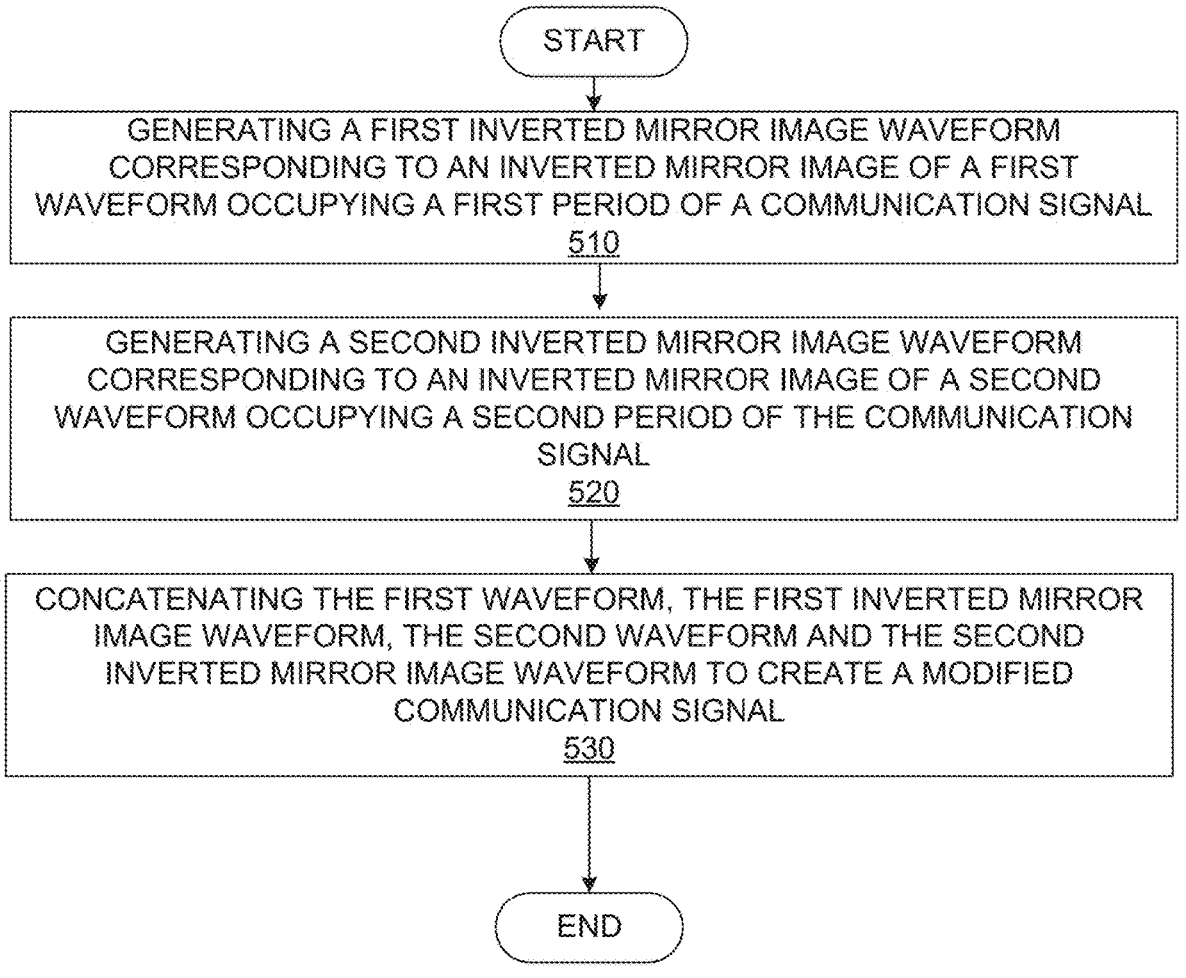
FIG. 5 is a flowchart that describes a signal modification method according to some embodiments of the present disclosure.

FIG. 5 is a flowchart that describes a signal modification method according to some embodiments of the present disclosure. In some embodiments, at 510, the method may include generating a first inverted mirror image waveform corresponding to an inverted mirror image of a first waveform occupying a first period of a communication signal. At 520, the method may include generating a second inverted mirror image waveform corresponding to an inverted mirror image of a second waveform occupying a second period of the communication signal. At 530, the method may include concatenating the first waveform, the first inverted mirror image waveform, the second waveform and the second inverted mirror image waveform to create a modified communication signal.

In some embodiments, the communication signal may be represented by a function f(t). The generating the first inverted mirror image waveform may include evaluating −f(−t) over an interval corresponding to a first period of the communication signal. In some embodiments, the generating the second inverted mirror image waveform may include evaluating −f(−t) over an interval corresponding to a second period of the communication signal.

FIG. 6 is a flowchart that describes an alternate signal modification method according to some embodiments of the present disclosure. At 610, the method includes generating N inverted mirror image waveforms corresponding to inverted mirror images of N waveforms respectively occupying N periods of a communication signal. At 620, the method may include creating a modified communication signal by concatenating instances of the N waveforms and instances of the N inverted mirror image waveforms. In some embodiments, at 630, the method may include transmitting the modified communication signal. The modified communication signal may include N intervals. An $i^{th}$ interval of the N intervals may include L instances of an $i^{th}$ of the N waveforms and L instances of an $i^{th}$ of the N inverted mirror images waveforms, where L may be an integer greater than 0 and corresponds to a level of inverted mirroring and where i=1, 2 . . . N.

In some embodiments, first and second of the N waveforms may be respectively denoted by w1 and w2 and first and second the N inverted mirror image waveforms may be respectively denoted by IMw1 and IMw2, the creating the modified communication signal further including, for L=1, concatenating w1 and IMw1 for inclusion within the first of the N intervals and concatenating w2 and IMw2 for inclusion with a second of the N intervals.

In some embodiments, first and second of the N waveforms may be respectively denoted by w1 and w2 and first and second the N inverted mirror image waveforms may be respectively denoted by IMw1 and IMw2, the creating the modified communication signal further including, for L=2, generating a waveform sequence w1, IMw1, IMw1, w1 for inclusion within the first of the N intervals and generating a waveform sequence w2, IMw2, IMw2, w2 for inclusion with a second of the N intervals.

In some embodiments, first and second of the N waveforms may be respectively denoted by w1 and w2 and first and second the N inverted mirror image waveforms may be respectively denoted by IMw1 and IMw2, the creating the modified communication signal further including, for L=4, generating a waveform sequence w1, IMw1, IMw1, w1, IMw1, w1, w1, IMw1 for inclusion within the first of the N intervals and generating a waveform sequence of w2, IMw2, IMw2, w2, IMw2, w2, w2, IMw2 for inclusion with a second of the N intervals.

FIG. 7 is a flowchart that describes a method for generating a communication signal according to some embodiments of the present disclosure. In some embodiments, at 710, the method may include generating a plurality of waveforms useable to carry signal information. At 720, the method may include, for each waveform of the plurality of waveforms, generating a waveform sequence including L instances of the waveform and L instances of an inverted mirror image waveform of the waveform, where L may be an integer greater than 0. At 730, the method may include concatenating the waveform sequences for the plurality of waveforms so as to form a communication signal.

In some embodiments, a first of the plurality of waveforms may be denoted by w1, a second of the plurality of waveforms may be denoted by w2, a first inverted mirror image waveform of w1 may be denoted by IMw1, and a second inverted mirror image waveform of w2 may be denoted by IMw2, the concatenating further including, for L=1, concatenating w1 and IMw1 for inclusion within a first of the waveform sequences and concatenating w2 and IMw2 for inclusion with a second of the waveform sequences.

In some embodiments, a first of the plurality of waveforms may be denoted by w1, a second of the plurality of waveforms may be denoted by w2, a first inverted mirror image waveform of w1 may be denoted by IMw1, and a second inverted mirror image waveform of w2 may be denoted by IMw2, the concatenating further including, for L=1, generating w1, IMw1, IMw1, w1 for inclusion within a first of the waveform sequences and generating w2, IMw2, IMw2, w2 for inclusion with a second of the waveform sequences.

In some embodiments, a first of the plurality of waveforms may be denoted by w1, a second of the plurality of waveforms may be denoted by w2, a first inverted mirror image waveform of w1 may be denoted by IMw1, and a second inverted mirror image waveform of w2 may be denoted by IMw2, the concatenating further including, for L=1, generating w1, IMw1, IMw1, w1, IMw1, w1, w1, IMw1 for inclusion within a first of the waveform sequences and generating w2, IMw2, IMw2, w2, IMw2, w2, w2, IMw2 for inclusion with a second of the waveform sequences. In some embodiments, the communication signal may be represented by a function f(t). A first instance of the L instances of an inverted mirror image waveform corresponds to evaluation of $-f(-t)$ over an interval corresponding to a first period of the communication signal.

In some embodiments, the communication signal may be represented by a function f(t). The generating N inverted mirror image waveforms may include evaluating $-f(-t)$ over N intervals respectively corresponding to the N periods of the communication signal.

Figure 8:
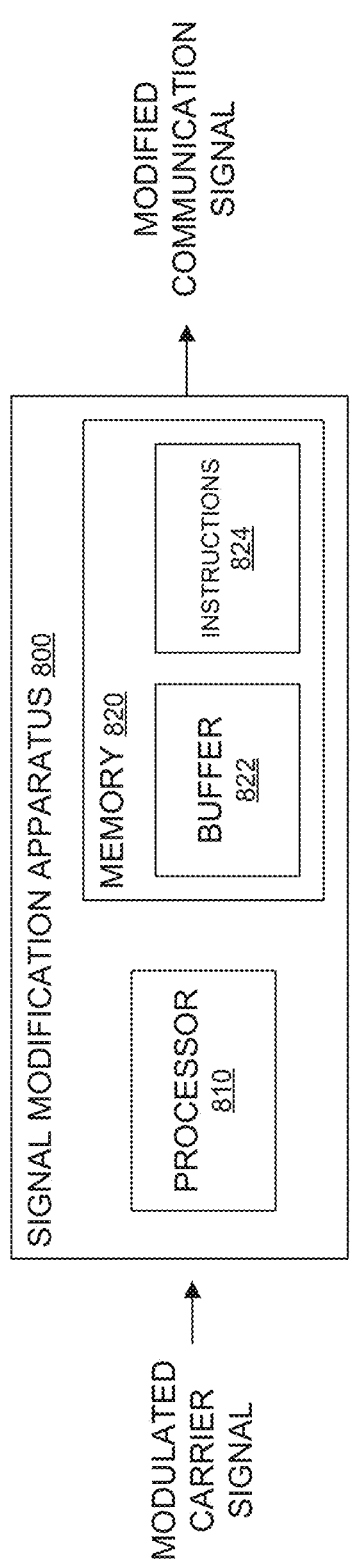
FIG. 8 is a block diagram that describes a signal modification apparatus according to some embodiments of the present disclosure.

FIG. 8 is a block diagram that describes a signal modification apparatus 800 according to some embodiments of the present disclosure. In some embodiments, the signal modification apparatus 800 may include a processor 810 and a memory 820. The memory 820 may include a buffer 822 for storing periods of a modulated carrier signal. The memory 820 may also include instructions 824 which, when executed by the processor 810, cause the processor 810 to (i) generate a plurality of inverted mirror image waveforms corresponding to inverted mirror images of the periods of the modulated carrier signal, and (ii) create a modified communication signal by inserting one or more of the plurality of inverted mirror image waveforms between ones of the plurality of periods of the modulated carrier signal.

In some embodiments, the modulated carrier signal may be represented by a function f(t). The instructions 824 may also include instructions which, when executed by the processor 810, cause the processor 810 to generate a first inverted mirror image waveform of the plurality of inverted mirror image waveforms by evaluating $-f(-t)$ over an interval corresponding to a first period of the modulated carrier signal.

Figure 9:
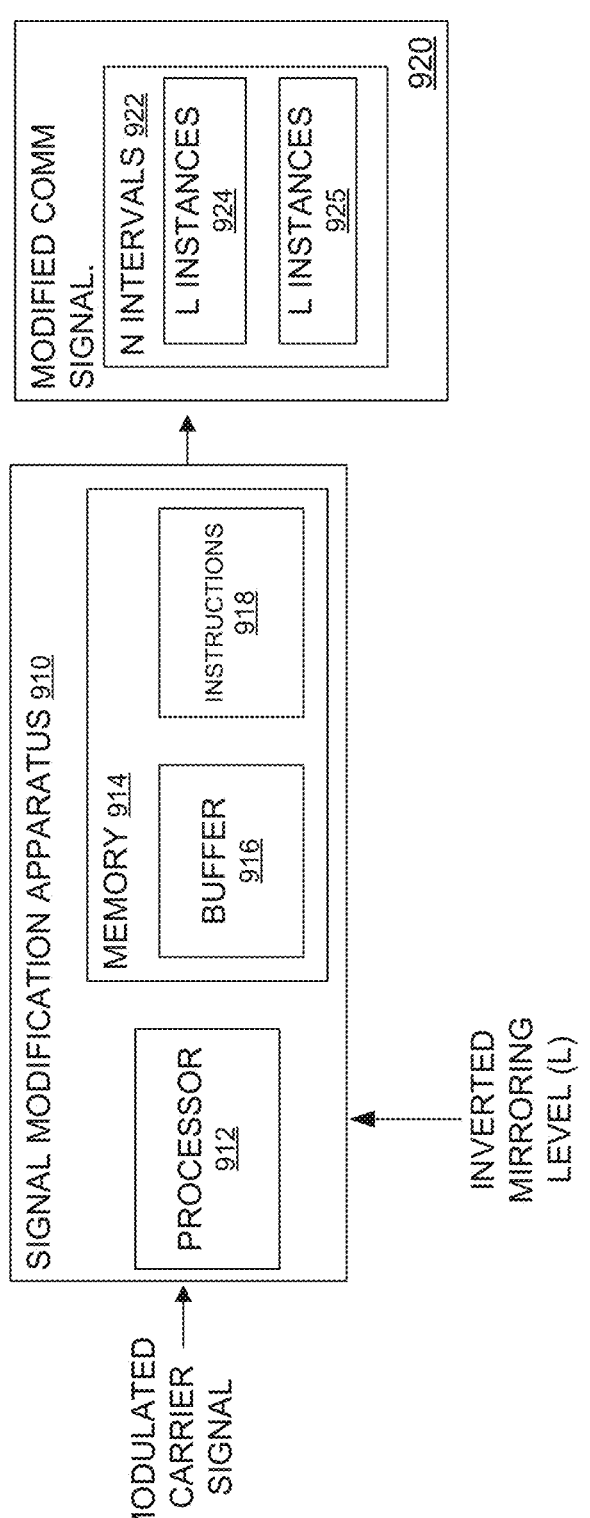
FIG. 9 is a block diagram that describes a signal modification apparatus according to some embodiments of the present disclosure.

FIG. 9 is a block diagram that describes a signal modification apparatus 910 according to some embodiments of the present disclosure. In some embodiments, the signal modification apparatus 910 may include a processor 912 and a memory 914. The memory 914 may include a buffer 916 for storing periods of a modulated carrier signal. The memory 914 may also include instructions 918 executed by the processor 912. During operation of the apparatus 910, the processor 912 generates N inverted mirror image waveforms corresponding to inverted mirror images of N waveforms respectively occupying N periods of the modulated carrier signal. The processor 912 also creates a modified communication signal 920 by concatenating instances of the N waveforms and instances of the N inverted mirror image may waveform. The modified communication signal 920 may include N intervals 922. The N intervals 922 may also include Z instances 924 of an $i^{th}$ of the N waveforms and Z instances 925 of an $i^{th}$ of the N inverted mirror images waveforms, where L may be an integer greater than 0 and corresponds to a level of inverted mirroring and where i=1, 2 . . . N. An $i^{th}$ interval of the N intervals 922.

In some embodiments, first and second of the N waveforms may be respectively denoted by w1 and w2 and first and second the N inverted mirror image waveforms may be respectively denoted by IMw1 and IMw2. The instructions 918 may also include instructions which, when executed by the processor 912, cause the processor 912 to, for L=2, generate a waveform sequence w1, IMw1, IMw1, w1 for inclusion within the first of the N intervals 922 and generate a waveform sequence w2, IMw2, IMw2, w2 for inclusion with a second of the N intervals 922.

In some embodiments, first and second of the N waveforms may be respectively denoted by w1 and w2 and first and second the N inverted mirror image waveforms may be respectively denoted by IMw1 and IMw2. The instructions 918 may also include instructions which, when executed by the processor 912, cause the processor 912 to, for L=4, generate a waveform sequence w1, IMw1, IMw1, w1, IMw1, w1, w1, IMw1 for inclusion within the first of the N intervals 922 and generate a waveform sequence of w2, IMw2, IMw2, w2, IMw2, w2, w2, IMw2 for inclusion with a second of the N intervals 922. In some embodiments, the modulated carrier signal may be represented by a function f(t). The instructions 918 may also include instructions which, when executed by the processor 912, cause the processor 912 to generate the $i^{th}$ of the N inverted mirror image waveforms by evaluating $-f(-t)$ over the $i^{th}$ period of the N periods of the modulated carrier signal.

Figure 10:
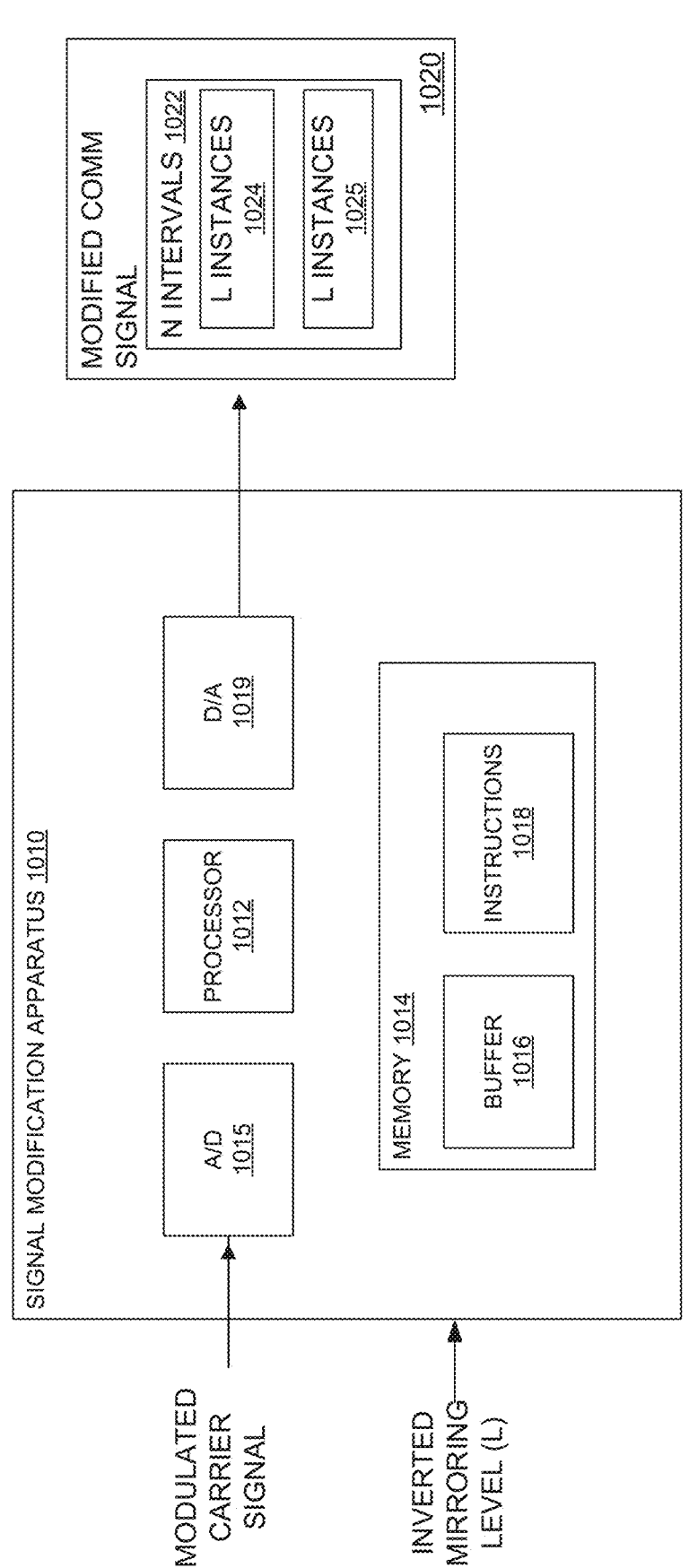
FIG. 10 is a block diagram that describes a signal modification apparatus according to some embodiments of the present disclosure.

FIG. 10 is a block diagram that describes a signal modification apparatus 1010 according to some embodiments of the present disclosure. In some embodiments, the signal modification apparatus 1010 may include a processor 1012 and a memory 1014. The memory 1014 may include a buffer 1016 for storing periods of a modulated carrier signal. The memory 1014 may also include instructions 1018 executed by the processor 1012. The signal modification apparatus 1010 may include an analog-to digital converter 1015 configured to receive a modulated analog signal and to generate the periods of the modulated carrier signal. Digital-to-analog converter circuitry 1019 is configured to produce a modulated communication signal 1020.

During operation of the apparatus 1010, the processor 1012 generates N inverted mirror image waveforms corresponding to inverted mirror images of N waveforms respectively occupying N periods of the modulated carrier signal. The processor 1012 also creates a modified communication signal 1020 by concatenating instances of the N waveforms and instances of the N inverted mirror image may waveform. The modified communication signal 1020 may include N intervals 1022. The N intervals 1022 may also include Z instances 1024 of an $i^{th}$ of the N waveforms and L instances 1025 of an $i^{th}$ of the N inverted mirror images waveforms, where L may be an integer greater than 0 and corresponds to a level of inverted mirroring and where i=1, 2 . . . N. An $i^{th}$ interval of the N intervals 1022.

In some embodiments, first and second of the N waveforms may be respectively denoted by w1 and w2 and first and second the N inverted mirror image waveforms may be respectively denoted by IMw1 and IMw2. The instructions 1018 may also include instructions which, when executed by the processor 1012, cause the processor 1012 to, for L=2, generate a waveform sequence w1, IMw1, IMw1, w1 for inclusion within the first of the N intervals 1022 and generate a waveform sequence w2, IMw2, IMw2, w2 for inclusion with a second of the N intervals 1022.

In some embodiments, first and second of the N waveforms may be respectively denoted by w1 and w2 and first and second the N inverted mirror image waveforms may be respectively denoted by IMw1 and IMw2. The instructions 1018 may also include instructions which, when executed by the processor 1012, cause the processor 1012 to, for L=4, generate a waveform sequence w1, IMw1, IMw1, w1, IMw1, w1, w1, IMw1 for inclusion within the first of the N intervals 1022 and generate a waveform sequence of w2, IMw2, IMw2, w2, IMw2, w2, w2, IMw2 for inclusion with a second of the N intervals 1022. In some embodiments, the modulated carrier signal may be represented by a function f(t). The instructions 1018 may also include instructions which, when executed by the processor 1012, cause the processor 1012 to generate the i$^{th}$ of the N inverted mirror image waveforms by evaluating −f(−t) over the i$^{th}$ period of the N periods of the modulated carrier signal.

Figure 11:
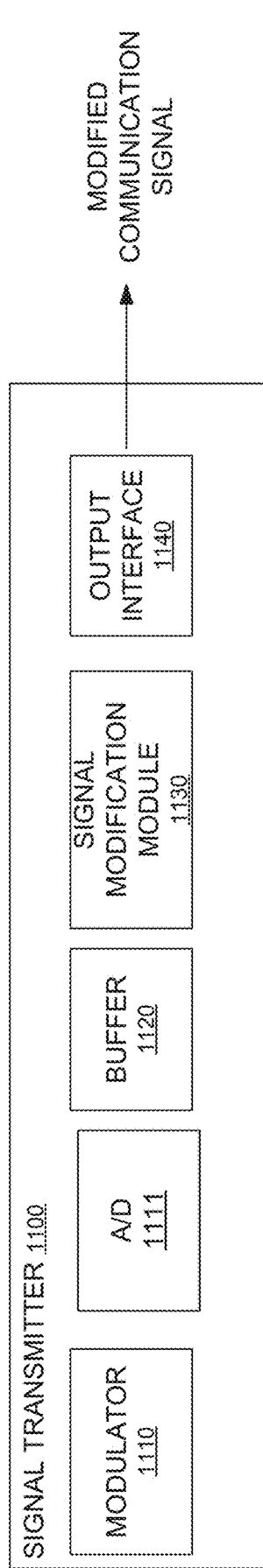
FIG. 11 is a block diagram that describes a signal transmitter according to some embodiments of the present disclosure.

FIG. 11 is a block diagram that describes a signal transmitter 1100, according to some embodiments of the present disclosure. In some embodiments, the signal transmitter 1100 may include a modulator 1110 for producing a modulated carrier signal. An analog-to-digital converter 1142 is configured to generate digital samples of the periods of the modulated carrier signal for storage in a buffer 1120. The signal transmitter 1100 further includes an output interface 1140 for outputting a modified communication signal. The signal transmitter 1100 may also include a signal modification module operative 1130 to (i) generate a plurality of inverted mirror image waveforms corresponding to inverted mirror images of the periods of the modulated carrier signal, and (ii) create a modified communication signal by inserting one or more of the plurality of inverted mirror image waveforms between ones of the plurality of periods of the modulated carrier signal. In some embodiments, the modulated communication signal may be an analog modulated communication signal. In some embodiments, a digital-to-analog converter operatively coupled to the output interface 1140.

Figure 12:
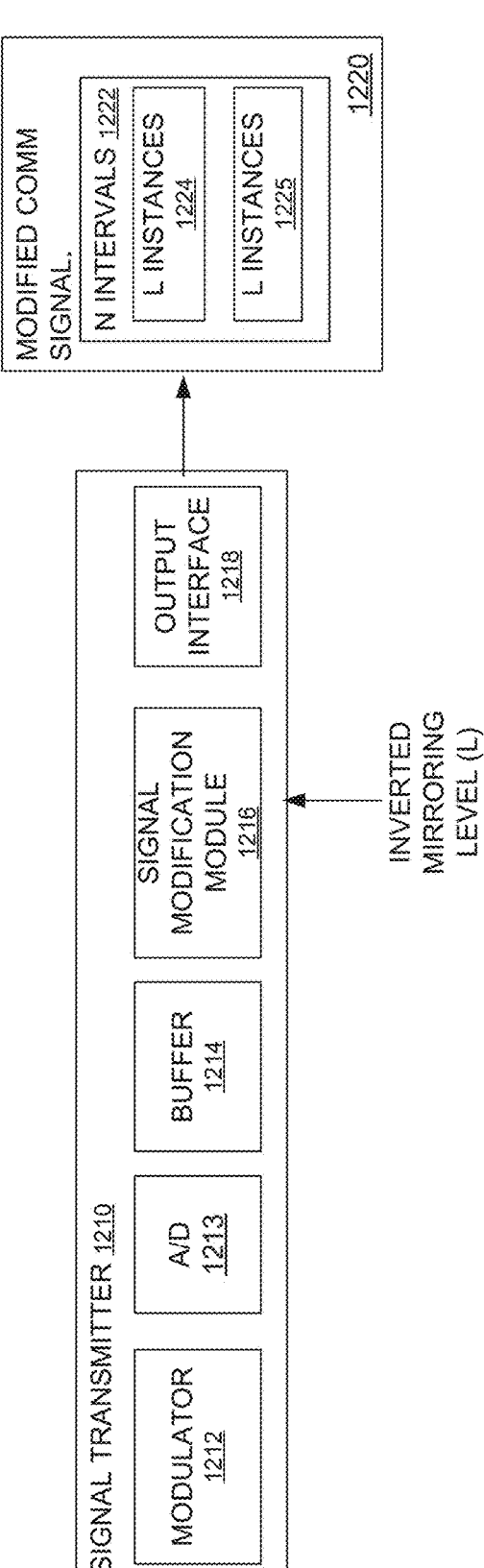
FIG. 12 is a block diagram that describes a signal transmitter according to some embodiments of the present disclosure.

FIG. 12 is a block diagram that describes a signal transmitter 1210, according to some embodiments of the present disclosure. In some embodiments. The signal transmitter 1210 may include a modulator 1212 for producing a modulated communication signal. An analog-to-digital converter 1213 is configured to generate digital samples of the periods of the modulated communication signal for storage in a buffer 1214. A signal modification module 1216 is operative to: (i) generate or retrieve N inverted mirror image waveforms corresponding to inverted mirror images of N waveforms respectively occupying N periods of the modulated communication signal, (ii) create a modified communication signal 1220 by concatenating instances of the N waveforms and instances of the N inverted mirror image waveforms. An output interface 1218 is provided for outputting the modified communication signal 1220.

The modified communication signal 1220 may include N intervals 1222. The N intervals 1222 may also include Z instances 1224 of an i$^{th}$ of the N waveforms and Z instances of an i$^{th}$ of the N inverted mirror image waveforms, where L may be an integer greater than 0 and corresponds to a level of inverted mirroring, and where i=1, 2 . . . N.

In some embodiments, first and second of the N waveforms may be respectively denoted by w1 and w2 and first and second the N inverted mirror image waveforms may be respectively denoted by IMw1 and IMw2, the signal modification module being further configured to, for L=2, generate a waveform sequence w1, IMw1, IMw1, w1 for inclusion within the first of the N intervals 1222 and generate a waveform sequence w2, IMw2, IMw2, w2 for inclusion with a second of the N intervals 1222.

In some embodiments, first and second of the N waveforms may be respectively denoted by w1 and w2 and first and second the N inverted mirror image waveforms may be respectively denoted by IMw1 and IMw2, the signal modification module 1216 being further configured to, for L=4, generate a waveform sequence w1, IMw1, IMw1, w1, IMw1, w1, w1, IMw1 for inclusion within the first of the N intervals 1222 and generate a waveform sequence of w2, IMw2, IMw2, w2, IMw2, w2, w2, IMw2 for inclusion with a second of the N intervals 1222. In some embodiments, the modulated communication signal may be represented by a function f(t). The signal modification module may be further operative to generate the i$^{th}$ of the N inverted mirror image waveforms by evaluating −f(−t) over the i$^{th}$ period of the N periods of the modulated communication signal.

Figure 13:
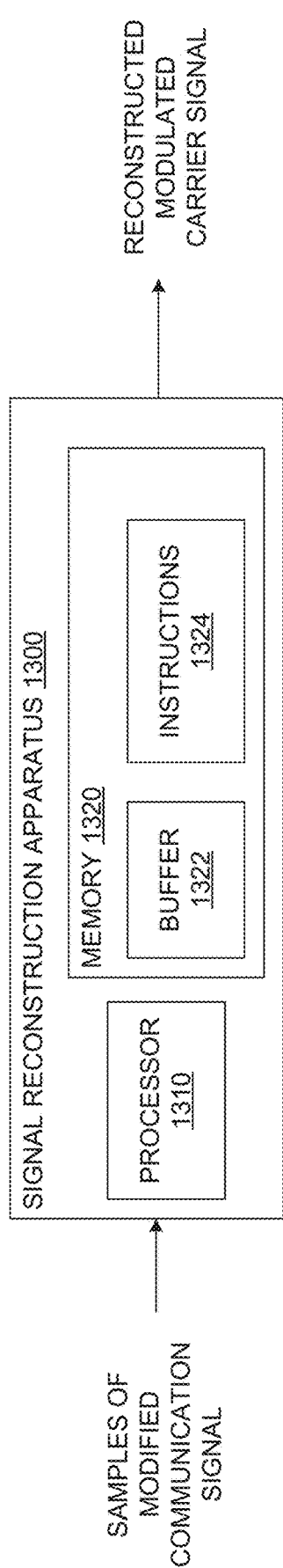
FIG. 13 is a block diagram that describes a signal reconstruction apparatus according to some embodiments of the present disclosure.

FIG. 13 is a block diagram that describes a signal reconstruction apparatus 1300, according to some embodiments of the present disclosure. In some embodiments, the signal reconstruction apparatus 1300 may include a processor 1310 and a memory 1320. The memory 1320 may include a buffer 1322 for storing a received version of a modified communication signal generated by inserting one or more of a plurality of inverted mirror image waveforms between ones of a plurality of periods of a modulated carrier signal. The memory 1320 may also include instructions 1324 which, when executed by the processor 1310, cause the processor 1310 to (i) identify the plurality of periods of the modulated carrier signal within the modified communication signal stored within the buffer 1322, and (ii) reconstruct the modulated carrier signal into a reconstructed modulated carrier signal by concatenating the plurality of periods of the modulated carrier signal identified within the buffer 1322. The plurality of inverted mirror image waveforms may correspond to inverted mirror images of the periods of the modulated carrier signal.

Figure 14:
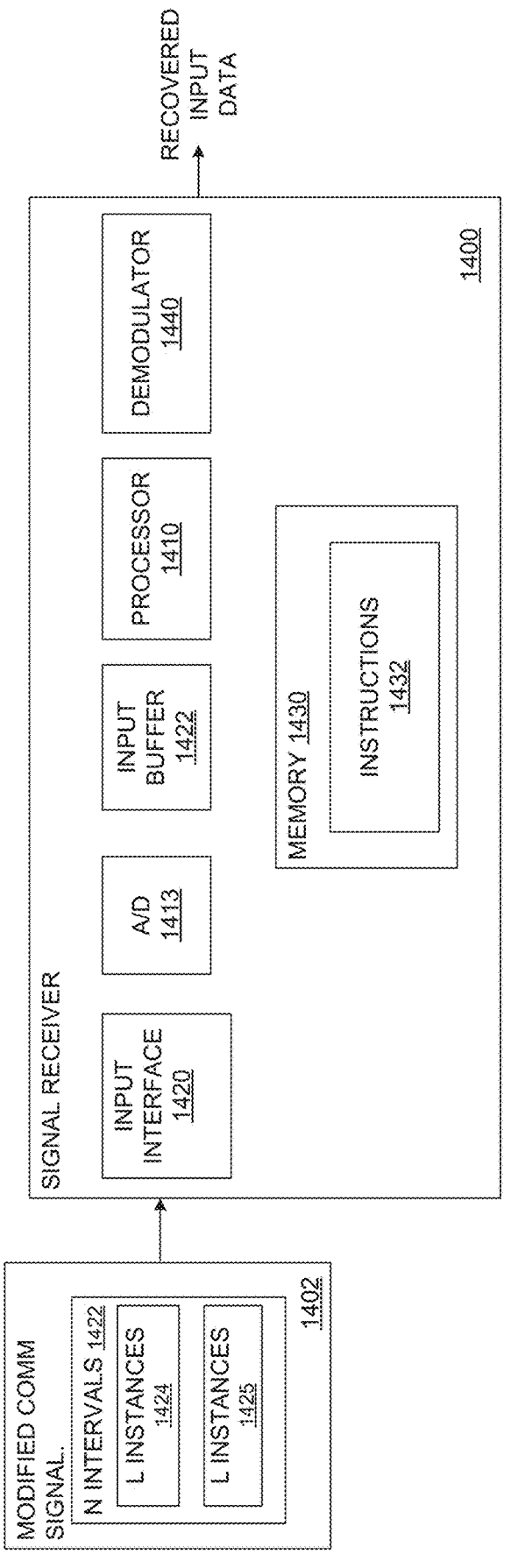
FIG. 14 is a block diagram that describes a signal receiver according to some embodiments of the present disclosure.

FIG. 14 is a block diagram that describes a signal receiver 1400, according to some embodiments of the present disclosure. In some embodiments, the signal receiver 1400 may include a processor 1410, an input interface 1420 for receiving a modified communication signal 1402 generated at a transmitter by inserting one or more of a plurality of inverted mirror image waveforms between ones of a plurality of periods of a modulated carrier signal, and a memory 1430.

An analog-to-digital converter 1413 is configured to generate digital samples of intervals of the modified communication signal 1402 for storage in an input buffer 1422. The plurality of inverted mirror image waveforms may correspond to inverted mirror images of the periods of the modulated carrier signal. The memory 1430 may also include instructions 1432 which, when executed by the processor 1410, cause the processor 1410 to (i) identify the plurality of periods of the modulated carrier signal within the modified communication signal stored within the buffer 1422, and (ii) reconstruct the modulated carrier signal into a reconstructed modulated carrier signal by concatenating the plurality of periods of the modulated carrier signal identified within the buffer 1422. A demodulator 1440 recovers input data carried by the modulated carrier signal 1402 by demodulating the reconstructed modulated carrier signal.

The modified communication signal 1402 may include N intervals 1422. The N intervals 1422 may also include L instances 1424 of an i$^{th}$ of the N waveforms and L instances 1425 of an i$^{th}$ of the N inverted mirror images waveforms, where L may be an integer greater than 0 and corresponds to a level of inverted mirroring and where i=1, 2 . . . N. In some embodiments, the processor 1410 identifies the instances of the N waveforms of the modified communication signal 1402 stored within the buffer 1422, and (ii) reconstructs the modulated carrier signal into a reconstructed modulated carrier signal by concatenating ones of the instances of the N waveforms stored within the buffer 1422 corresponding to the N periods of the modulated carrier signal.

In some embodiments, first and second of the N waveforms may be respectively denoted by w1 and w2 and first and second the N inverted mirror image waveforms may be respectively denoted by IMw1 and IMw2. For L=2, a waveform sequence w1, IMw1, IMw1, w1 may be included within the first of the N intervals 1422 and a waveform sequence w2, IMw2, IMw2, w2 may be included with a second of the N intervals 1422. In some embodiments, first and second of the N waveforms may be respectively denoted by w1 and w2 and first and second the N inverted mirror image waveforms may be respectively denoted by IMw1 and IMw2. For L=4, a waveform sequence w1, IMw1, IMw1, w1, IMw1, w1, w1, IMw1 may be included within the first of the N intervals 1422 and a waveform sequence of w2, IMw2, IMw2, w2, IMw2, w2, w2, IMw2 may be included within a second of the N intervals 1422.

The disclosure discussed herein provides and describes examples of some embodiments of the system for data communication with high spectral efficiency. The designs, figures, and descriptions are non-limiting examples of selected embodiments of the disclosure. For example, other embodiments of the disclosed device may or may not include the features described herein. Moreover, disclosed advantages and benefits may apply to only certain embodiments of the disclosure and should not be used to limit the various disclosures.

As used herein, coupled means directly or indirectly connected by a suitable means known to persons of ordinary skill in the art. Coupled items may include interposed features such as, for example, A is coupled to C via B. Unless otherwise stated, the type of coupling, whether it be mechanical, electrical, fluid, optical, radiation, or other is indicated by the context in which the term is used.

As used in this specification, a module can be, for example, any assembly and/or set of operatively-coupled electrical components associated with performing a specific function(s), and can include, for example, a memory, a processor, electrical traces, optical connectors, software (that is stored in memory and/or executing in hardware) and/or the like.

As used in this specification, the singular forms "a," "an" and "the" include plural referents unless the context clearly dictates otherwise. Thus, for example, the term "an actuator" is intended to mean a single actuator or a combination of actuators.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described embodiments.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media in which the KCM may reside include, without limitation, one time programmable (OTP) memory, protected Random-Access Memory (RAM) and flash memory. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
generating N inverted mirror image waveforms corresponding to inverted mirror images of N waveforms respectively occupying N periods of a communication signal; and
creating a modified communication signal by concatenating instances of the N waveforms and instances of the N inverted mirror image waveforms wherein the modified communication signal includes N intervals and wherein an $i^{th}$ interval of the N intervals includes L instances of an $i^{th}$ of the N waveforms and L instances of an $i^{th}$ of the N inverted mirror images waveforms, where L is an integer greater than 0 and corresponds to a level of inverted mirroring and where i=1, 2 . . . N;
wherein first and second of the N waveforms are respectively denoted by w1 and w2 and first and second the N inverted mirror image waveforms are respectively denoted by IMw1 and IMw2, the creating the modified communication signal further including, for L=2, generating a waveform sequence w1, IMw1, IMw1, w1 for inclusion within the first of the N intervals and generating a waveform sequence w2, IMw2, IMw2, w2 for inclusion with a second of the N intervals.

2. The method of claim 1 wherein first and second of the N waveforms are respectively denoted by w1 and w2 and first and second the N inverted mirror image waveforms are respectively denoted by IMw1 and IMw2, the creating the modified communication signal further including, for L=1, concatenating w1 and IMw1 for inclusion within the first of the N intervals and concatenating w2 and IMw2 for inclusion with a second of the N intervals.

3. The method of claim 1 wherein first and second of the N waveforms are respectively denoted by w1 and w2 and first and second the N inverted mirror image waveforms are respectively denoted by IMw1 and IMw2, the creating the modified communication signal further including, for L=4, generating a waveform sequence w1, IMw1, IMw1, w1, IMw1, w1, w1, IMw1 for inclusion within the first of the N intervals and generating a waveform sequence of w2, IMw2, IMw2, w2, IMw2, w2, w2, IMw2 for inclusion with a second of the N intervals.

4. The method of claim 1 wherein the communication signal is represented by a function f(t) and wherein the generating N inverted mirror image waveforms includes evaluating −f(−t) over N intervals respectively corresponding to the N periods of the communication signal.

5. A method comprising:
generating a plurality of waveforms useable to carry signal information;
for each waveform of the plurality of waveforms, generating a waveform sequence including L instances of the waveform and L instances of an inverted mirror image waveform of the waveform, where L is an integer greater than 0;
concatenating the waveform sequences for the plurality of waveforms so as to form a communication signal;
wherein a first of the plurality of waveforms is denoted by w1, a second of the plurality of waveforms is denoted by w2, a first inverted mirror image waveform of w1 is denoted by IMw1, and a second inverted mirror image waveform of w2 is denoted by IMw2, the concatenating further including, for L=1, generating w1, IMw1, IMw1, w1 for inclusion within a first of the waveform sequences and generating w2, IMw2, IMw2, w2 for inclusion with a second of the waveform sequences.

6. The method of claim 5 wherein a first of the plurality of waveforms is denoted by w1, a second of the plurality of waveforms is denoted by w2, a first inverted mirror image waveform of w1 is denoted by IMw1, and a second inverted mirror image waveform of w2 is denoted by IMw2, the concatenating further including, for L=1, concatenating w1 and IMw1 for inclusion within a first of the waveform sequences and concatenating w2 and IMw2 for inclusion with a second of the waveform sequences.

7. The method of claim 5 wherein a first of the plurality of waveforms is denoted by w1, a second of the plurality of waveforms is denoted by w2, a first inverted mirror image waveform of w1 is denoted by IMw1, and a second inverted mirror image waveform of w2 is denoted by IMw2, the concatenating further including, for L=1, generating w1, IMw1, IMw1, w1, IMw1, w1, w1, IMw1 for inclusion within a first of the waveform sequences and generating w2, IMw2, IMw2, w2, IMw2, w2, w2, IMw2 for inclusion with a second of the waveform sequences.

8. The method of claim 5 wherein the communication signal is represented by a function f(t) and wherein a first instance of the L instances of an inverted mirror image waveform corresponds to evaluation of −f(−t) over an interval corresponding to a first period of the communication signal.

9. A method, comprising:

generating a first inverted mirror image waveform corresponding to an inverted mirror image of a first waveform occupying a first period of a communication signal;

generating a second inverted mirror image waveform corresponding to an inverted mirror image of a second waveform occupying a second period of the communication signal;

concatenating the first waveform, the first inverted mirror image waveform, the second waveform and the second inverted mirror image waveform to create a modified communication signal;

wherein the communication signal is represented by a function f(t) and wherein the generating the first inverted mirror image waveform includes evaluating −f(−t) over an interval corresponding to a first period of the communication signal.

10. The method of claim 9 wherein the generating the second inverted mirror image waveform includes evaluating −f(−t) over an interval corresponding to a second period of the communication signal.

11. A signal modification apparatus, the apparatus comprising:

a processor;

a memory including a buffer for storing periods of a modulated carrier signal, the memory further including instructions which, when executed by the processor, cause the processor to:

(i) generate N inverted mirror image waveforms corresponding to inverted mirror images of N waveforms respectively occupying N periods of the modulated carrier signal; and (ii) create a modified communication signal by concatenating instances of the N waveforms and instances of the N inverted mirror image waveforms wherein the modified communication signal includes N intervals and wherein an $i^{th}$ interval of the N intervals includes L instances of an $i^{th}$ of the N waveforms and L instances of an $i^{th}$ of the N inverted mirror images waveforms, where L is an integer greater than 0 and corresponds to a level of inverted mirroring and where i=1, 2 . . . N;

wherein first and second of the N waveforms are respectively denoted by w1 and w2 and first and second the N inverted mirror image waveforms are respectively denoted by IMw1 and IMw2, the instructions further including instructions which, when executed by the processor, cause the processor to, for L=2, generate a waveform sequence w1, IMw1, IMw1, w1 for inclusion within the first of the N intervals and generate a waveform sequence w2, IMw2, IMw2, w2 for inclusion with a second of the N intervals.

12. The signal modification apparatus of claim 11 wherein first and second of the N waveforms are respectively denoted by w1 and w2 and first and second the N inverted mirror image waveforms are respectively denoted by IMw1 and IMw2, the instructions further including instructions which, when executed by the processor, cause the processor to, for L=1, generate a waveform sequence containing w1 and IMw1 for inclusion within the first of the N intervals and generate a waveform sequence containing w2 and IMw2 for inclusion within a second of the N intervals.

13. The signal transmitter of claim 11 wherein first and second of the N waveforms are respectively denoted by w1 and w2 and first and second the N inverted mirror image waveforms are respectively denoted by IMw1 and IMw2, the instructions further including instructions which, when executed by the processor, cause the processor to, for L=4, generate a waveform sequence w1, IMw1, IMw1, w1, IMw1, w1, w1, IMw1 for inclusion within the first of the N intervals and generate a waveform sequence of w2, IMw2, IMw2, w2, IMw2, w2, w2, IMw2 for inclusion with a second of the N intervals.

14. A signal modification apparatus, the apparatus comprising:

a processor;

a memory including a buffer for storing periods of a modulated carrier signal, the memory further including instructions which, when executed by the processor, cause the processor to (i) generate a plurality of inverted mirror image waveforms corresponding to inverted mirror images of the periods of the modulated carrier signal, and (ii) create a modified communication signal by inserting one or more of the plurality of inverted mirror image waveforms between ones of the plurality of periods of the modulated carrier signal;

wherein the modulated carrier signal is represented by a function f(t) wherein the instructions further include instructions which, when executed by the processor, cause the processor to generate a first inverted mirror image waveform of the plurality of inverted mirror image waveforms by evaluating −f(−t) over an interval corresponding to a first period of the modulated carrier signal.

* * * * *